(12) United States Patent
Mori

(10) Patent No.: US 11,702,035 B2
(45) Date of Patent: Jul. 18, 2023

(54) RELAY ATTACK DETERMINATION DEVICE

(71) Applicant: Marelli Corporation, Saitama (JP)

(72) Inventor: Yuki Mori, Saitama (JP)

(73) Assignee: Marelli Corporation, Saitama (JP)

( * ) Notice: Subject to any disclaimer, the term of this patent is extended or adjusted under 35 U.S.C. 154(b) by 0 days.

(21) Appl. No.: 17/620,830

(22) PCT Filed: Oct. 14, 2020

(86) PCT No.: PCT/JP2020/038723
§ 371 (c)(1),
(2) Date: Dec. 20, 2021

(87) PCT Pub. No.: WO2021/111741
PCT Pub. Date: Jun. 10, 2021

(65) Prior Publication Data
US 2022/0379844 A1    Dec. 1, 2022

(30) Foreign Application Priority Data

Dec. 6, 2019  (JP) ................................. 2019-221120

(51) Int. Cl.
*B60R 25/24*    (2013.01)
*G07C 9/00*    (2020.01)

(52) U.S. Cl.
CPC .......... *B60R 25/245* (2013.01); *B60R 25/248* (2013.01); *G07C 9/00309* (2013.01); *G07C 2009/00555* (2013.01)

(58) Field of Classification Search
CPC . B60R 25/245; B60R 25/248; G07C 9/00309; G07C 2009/00555
See application file for complete search history.

(56) References Cited

U.S. PATENT DOCUMENTS 10,328,898 B2 *  6/2019  Golsch .................... B60R 25/20
10,438,430 B2 * 10/2019  Hayashi .................. E05B 81/78
(Continued)

FOREIGN PATENT DOCUMENTS

JP    2006-342545 A    12/2006
JP    2019-41348 A     3/2019
(Continued)

*Primary Examiner* — Thomas D Alunkal
(74) *Attorney, Agent, or Firm* — Young Basile Hanlon & MacFarlane, P.C.

(57) ABSTRACT

A portable device includes a reception antenna and a strength meter. The reception antenna includes antennas of three axes each receiving a first signal and a second signal. The strength meter measures a reception strength of the request signal and the request signal received by each of the three axes of the LF receiver. A relay attack determination device is provided with a comparator that executes a comparative process of strength ratios of the request signal and the request signal based upon a measurement value of the reception strength. In a case where the three axes include an ineffective axis, in which the measurement value of the reception strength of the request signal or the request signal deviates from a usable range, the comparator excludes the ineffective axis and executes the comparative process.

6 Claims, 13 Drawing Sheets

(56) References Cited

U.S. PATENT DOCUMENTS

| | | | |
|---|---|---|---|
| 2005/0136856 A1* | 6/2005 | Goldberg | H04B 7/0842 455/101 |
| 2016/0117877 A1* | 4/2016 | Hamada | G07C 9/00309 340/5.61 |
| 2016/0202697 A1* | 7/2016 | Matsumoto | H04W 12/122 701/2 |
| 2017/0291579 A1* | 10/2017 | Miyazawa | H04B 17/318 |
| 2019/0143942 A1* | 5/2019 | Neuhoff | G07C 9/00309 340/5.72 |
| 2019/0219678 A1 | 7/2019 | Miyazawa | |

FOREIGN PATENT DOCUMENTS

| | | |
|---|---|---|
| JP | 2019-83436 A | 5/2019 |
| JP | 2019-105026 A | 6/2019 |
| WO | 2018/070219 A1 | 4/2018 |
| WO | 2018/186075 A1 | 10/2018 |
| WO | 2019/193866 A1 | 10/2019 |

* cited by examiner

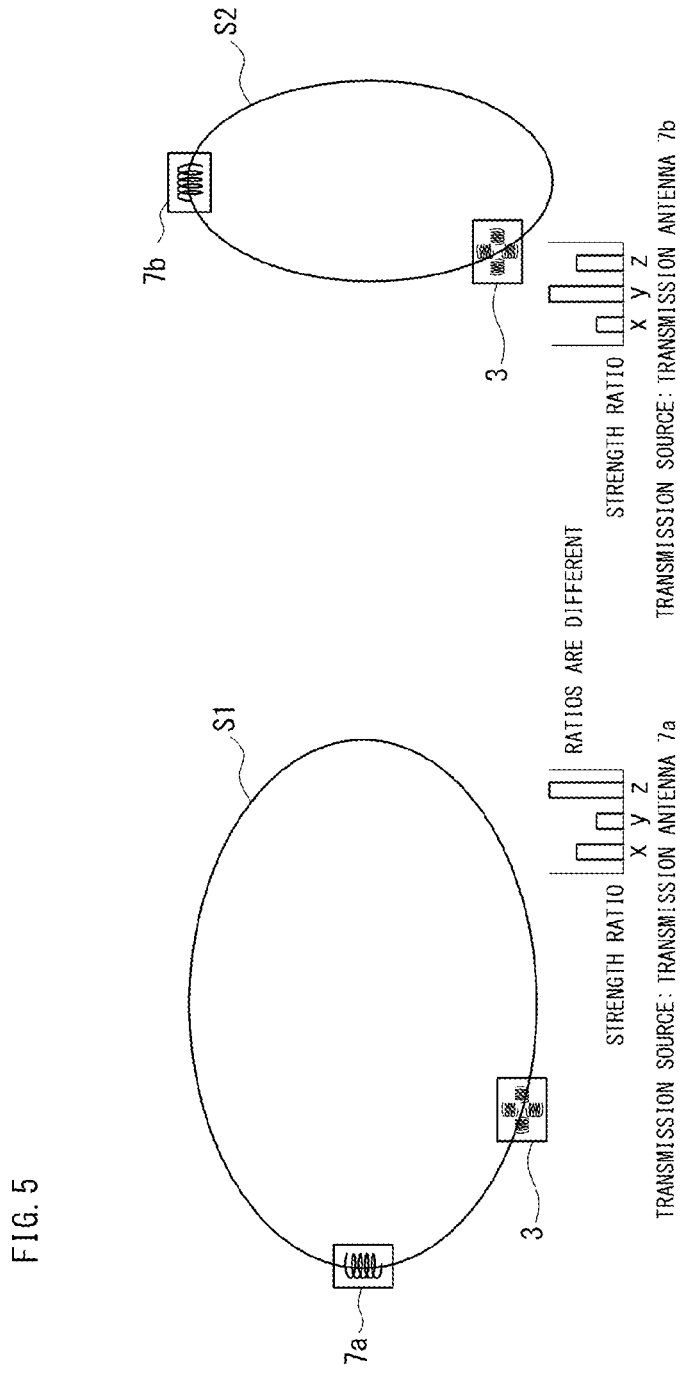

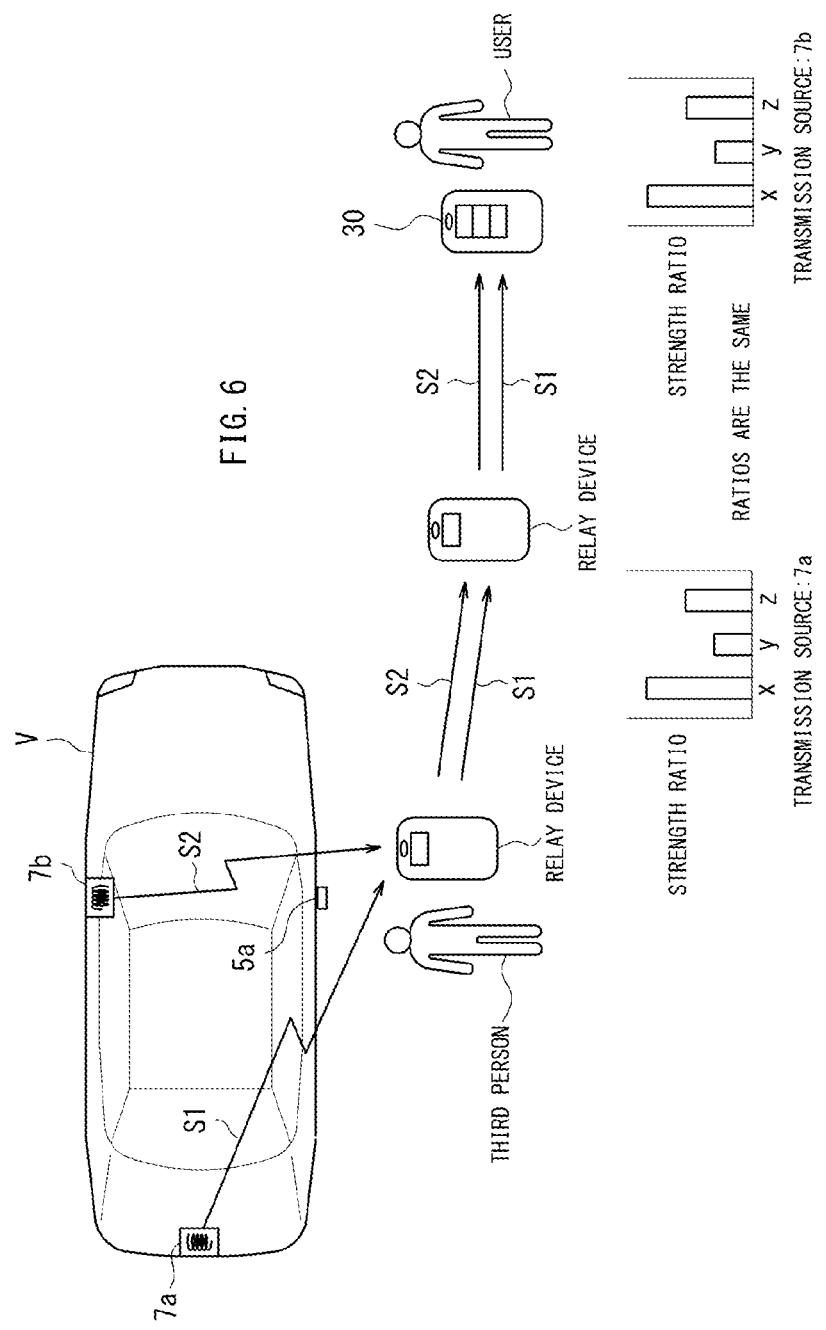

RELAY ATTACK DETERMINATION DEVICE

CROSS-REFERENCE TO RELATED APPLICATION

This application claims priority to and the benefit of Japanese Patent Application Serial No. 2019-221120, filed Dec. 6, 2019, the entire disclosure of which is hereby incorporated by reference.

TECHNICAL FIELD

The present invention relates to a relay attack determination device.

BACKGROUND ART

In a keyless entry system, wireless communications are carried out between an in-vehicle device and a portable device to control operations of in-vehicle equipment, such as locking and unlocking a door of a vehicle or performing start of an engine or the like.

For coping with a relay attack, it is proposed to transmit signals from transmission antennas respectively installed in different positions of the in-vehicle device, for example (for example, refer to Patent Document 1). The portable device receives the respective signals via a three-axis antenna and calculates a strength ratio based upon a reception strength measured in each axis. The portable device determines the relay attack by executing a comparative process of the calculated strength ratios in the respective signals. In a case where the portable device receives signals directly from the in-vehicle device, two signals transmitted from the different positions differ in the strength ratio, but in a case where a relay device relays the two signals, since the two signals are identical in strength, the relay attack can be determined.

CITATION LIST

Patent Document

Patent Document 1: Japanese Patent Laid-Open No. 2006-342545 A

SUMMARY

However, an RSSI circuit in the portable device for measuring the reception strength of the signal or the like has limitation to a range of reception strength capable of being accurately measured by the portable machine. When the reception strength of the signal inputted into part of the three axes deviates from this range due to an orientation of the three-axis antenna or an influence of noises or the like, a measurement value of the reception strength may differ from an actual reception strength. When the strength ratio calculated from this measurement value is used in the comparative process, there is a possibility that the determination of the relay attack cannot be made appropriately.

It is required to improve security in the keyless entry system by enhancing accuracy on the determination of the relay attack.

The present invention provides a relay attack determination device configured to determine a relay attack, in which wireless communications between an in-vehicle device and a portable device are relayed by a relay device, comprising:

a transmitter disposed on the in-vehicle device, the transmitter being configured to transmit a first signal and a second signal having an output condition different from an output condition in the first signal;

a receiver disposed on the portable device and including an antenna of plural axes respectively oriented in different directions to receive the first signal and the second signal in each of the plural axes;

a strength meter disposed on the portable device to measure a reception strength of the first signal and the second signal received by each of the plural axes of the receiver;

a comparator configured to execute a comparative process of reception strength ratios of the first signal and the second signal, based upon a measurement value of the reception strength; and a determiner configured to determine the relay attack based upon a result of the comparative process in the comparator, wherein in a case where the plural axes include an ineffective axis in which the measurement value of the reception strength of the first signal or the second signal deviates from a usable range, the comparator excludes the ineffective axis and executes the comparative process.

According to the present invention, it is possible to improve the security in the keyless entry system by enhancing the accuracy on the determination of the relay attack.

BRIEF DESCRIPTION OF THE DRAWINGS

FIG. 5 is a diagram showing an example of a strength ratio of a request signal transmitted from a transmission antenna.

FIG. 6 is a diagram explaining a mechanism of the relay attack.

DETAILED DESCRIPTION

Figure 1:
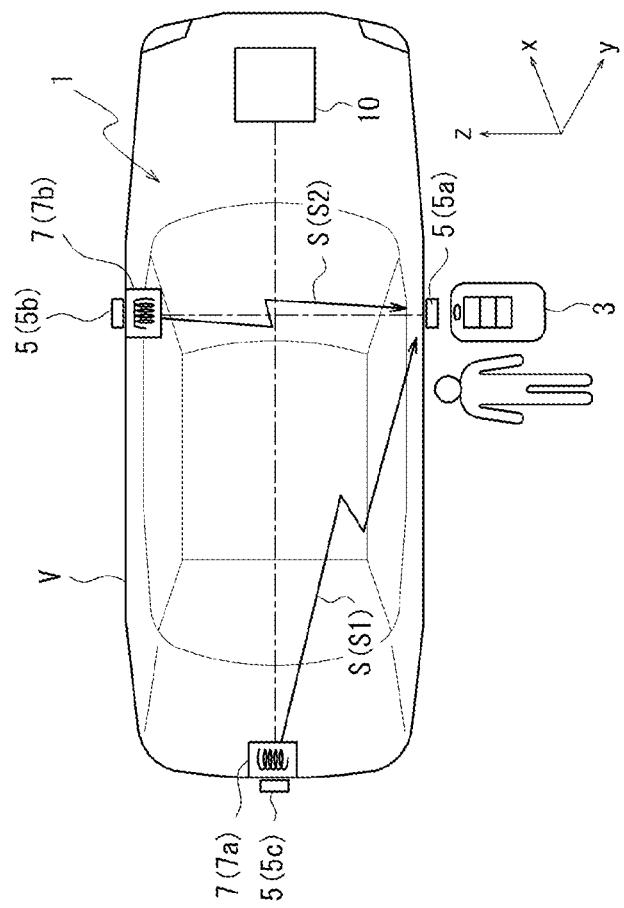
FIG. 1 is a schematic diagram of a relay attack determination device according to an embodiment of the present invention.

Hereinafter, an explanation will be made of an embodiment of the present invention by referring to the drawings.

FIG. 1 is a schematic diagram of a relay attack determination device according to an embodiment of the present invention.

As shown in FIG. 1, a keyless entry system includes an in-vehicle device 1 disposed in a vehicle V and a portable device 3 for a user of the vehicle V. The in-vehicle device 1 and the portable device 3 perform wireless communications to certify a correspondence relation between the in-vehicle device 1 and the portable device 3. The in-vehicle device 1 and the portable device 3 configure the keyless entry system and also configure the relay attack determination device which determines a relay attack to the vehicle V. The details of the relay attack will be described later.

The in-vehicle device 1 transmits a request signal S to the portable device 3, and the portable device 3 transmits an answer signal in response to the request signal S. The in-vehicle device 1 uses the answer signal to certify the correspondence relation between the vehicle V and the portable device 3, and performs control for lock or unlock of a door. The in-vehicle device 1 transmits the request signal S as an LF signal of 125-135 KHz, for example. The portable device 3 transmits, for example, a RF signal in a UHF band as the answer signal. It should be noted that a control target of the keyless entry system includes, not limited to the door lock but other in-vehicle equipment, such as an engine start or a steering lock, and a detailed explanation thereof is omitted. An explanation will be made of the control of the door lock, particularly of control of door unlock in the embodiment.

Figure 2:
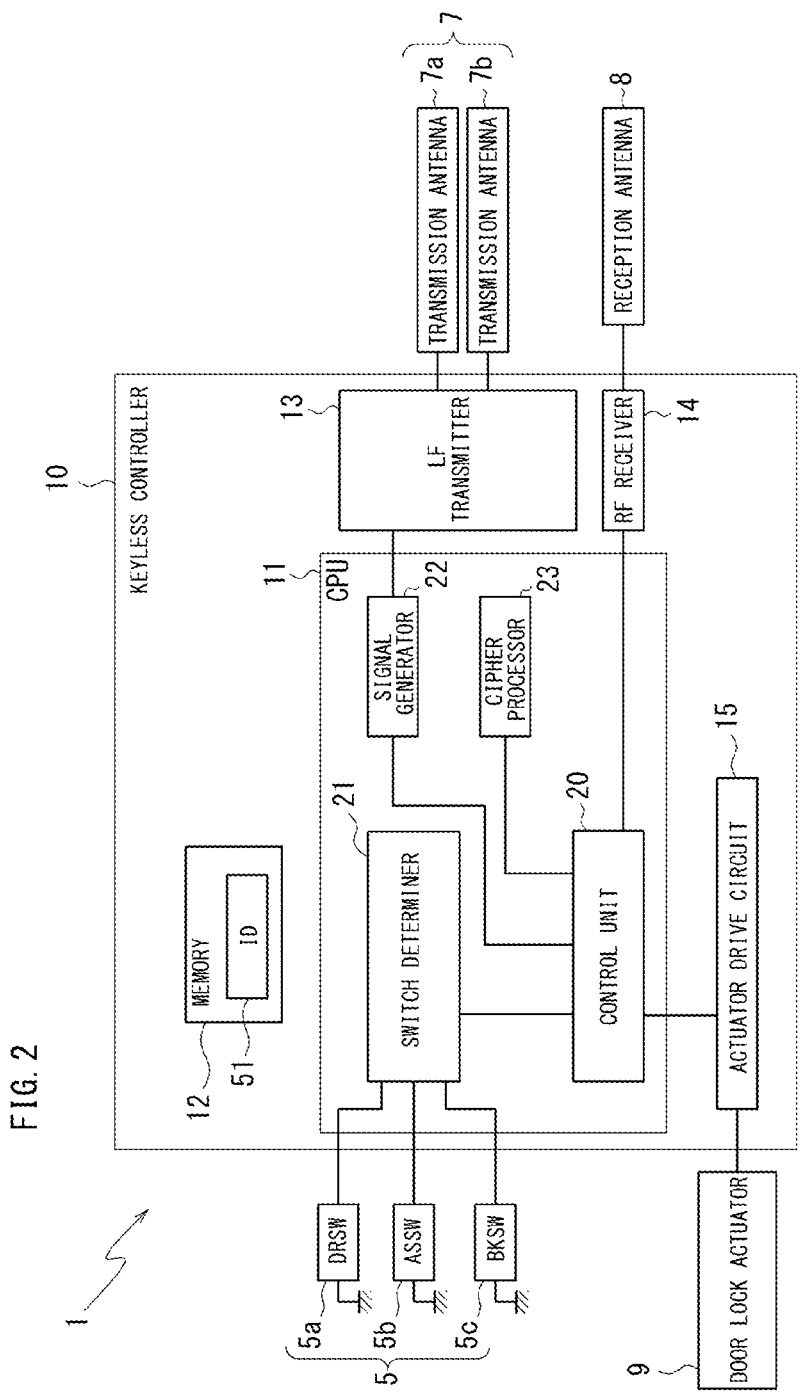
FIG. 2 is a block diagram showing the configuration of an in-vehicle device.

FIG. 2 is a block diagram showing the configuration of the in-vehicle device 1.

As shown in FIG. 2, the in-vehicle device 1 is provided with a request switch 5, a keyless controller 10, a transmission antenna 7, a reception antenna 8 and a door lock actuator 9.

The request switch 5 is installed in the door of a vehicle body and accepts an unlock request of the door from a user. The request switch 5 is composed of, as shown in FIG. 1, request switches 5a, 5b, 5c installed respectively in a driver seat door, a front passenger seat door and a trunk, for example. The request switch 5 may be a switch button, for example. The switch button accepts the unlock request by performing an operation such as pushing or touching by a user.

The transmission antenna 7, when the request switch 5 is operated, transmits the request signal S as the LF signal. The in-vehicle device 1 is provided with, for example, a transmission antenna 7a and a transmission antenna 7b as the transmission antenna 7, which are installed in the different positions. The transmission antenna 7a is installed in the vicinity of a rear door on the backward side of the vehicle V, for example, and the transmission antenna 7b is installed in the vicinity of a front passenger seat door on the forward side of the vehicle V, for example. It should be noted that the installation positions and the installation number of the transmission antenna 7 are not limited to those in this example. The transmission antennas 7 may be further installed in the vicinity of the driver seat door, near a rear seat, within a luggage room or the like.

The reception antenna 8 receives the answer signal from the portable device 3. The answer signal is transmitted as a response signal to the request signal S by the portable device 3. The door lock actuator 9 unlocks and locks the driver seat door, the front passenger seat door and rear doors.

The keyless controller 10 is connected to the request switch 5, the transmission antenna 7, the reception antenna 8 and the door lock actuator 9 each. The keyless controller 10 generates the request signal S in response to an operation of the request switch 5 and allows the request signal S to be transmitted from the transmission antenna 7 to the portable device 3. The keyless controller 10 receives the answer signal in response to the request signal S for certification. The keyless controller 10 controls a drive of the door lock actuator 9 in response to a certification result of the answer signal to perform the unlock of the door.

The keyless controller 10 is provided with a CPU 11, an LF transmitter 13, a RF receiver 14, a memory 12 and an actuator drive circuit 15. The LF transmitter 13 is configured of a transmission circuit and the like, and is connected to the transmission antenna 7. The LF transmitter 13 executes a process for digital/analogue conversion or the like of the request signal S generated in the CPU 11, which is caused to be transmitted as an LF wave from the transmission antenna 7. The RF receiver 14 is configured of a reception circuit and the like, and is connected to the reception antenna 8. The RF receiver 14 receives the answer signal via the reception antenna 8 and executes a process for digital/analogue conversion or the like of the received answer signal. The actuator drive circuit 15 is a circuit for causing the door lock actuator 9 to be driven in response to input of the CPU 11.

The memory 12 stores therein control programs of the keyless controller 10 and information necessary for the process of the keyless controller 10. The memory 12 also temporarily stores therein various data generated in the process of the CPU 11. The memory 12 stores therein ID51 of the portable device 3 as an example.

Figure 12A:
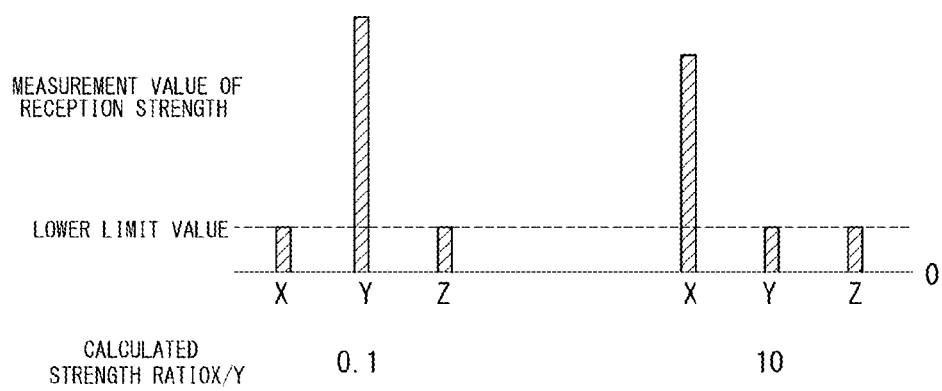
FIGS. 12A and 12B are diagrams showing a concept of a comparative process according to Modification 2.
Figure 12B:
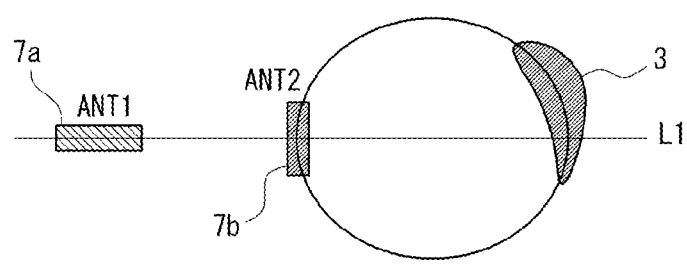

As shown in FIGS. 12A and 12B, the CPU 11 is provided with a control unit 20, a switch determiner 21, a signal generator 22 and a cipher processor 23. The control unit 20 is provided with a timer (not shown).

Not particularly described, but each part of the CPU 11 causes the process result to be temporarily stored in the memory 12, and reads out the necessary data and the process target from the memory 12 and resets the temporarily stored data after process completion.

The switch determiner 21 determines which of the request switches 5a, 5b, 5c is operated and inputs the determination result into the control unit 20.

The control unit 20 executes control the entirety of the CPU 11. The control unit 20 generates a cipher C such as random numbers regarding the transmission of the request signal S. The control unit 20 inputs the generated cipher C together with a process command into the cipher processor 23. The control unit 20 also inputs the generated cipher C together with a signal generating command into the signal generator 22.

The cipher processor 23 executes a calculation process using the cipher C generated in the control unit 20 by a predetermined calculation process according to a process command of the control unit 20. The predetermined calculation process incorporates therein ID51 of the portable device 3 stored in the memory 12. The cipher processor 23 causes the process result to be stored as an in-vehicle device-side process result in the memory 12. This in-vehicle device-side process result is used at the time of receiving the answer signal from the portable device 3.

The signal generator 22 generates the request signal S according to a signal generating command of the control unit 20, and outputs the request signal S to the LF transmitter 13. The signal generator 22 controls the LF transmitter 13 to output the request signal S from the transmission antenna 7a and the transmission antenna 7B each.

The signal generator 22 controls the LF transmitter 13 in such a manner that the request signal S is transmitted from the transmission antenna 7a and the transmission antenna 7B each. The LF transmitter 13 executes a process of the digital/analogue conversion or the like to the request signal S to be converted to the LF transmitting wave as an electromagnetic wave, and outputs the LF transmitting wave to the transmission antenna 7a and the transmission antenna 7B. The transmission antenna 7a and the transmission antenna 7B each form a magnetic field therearound. The portable device 3 detects the formed magnetic field to receive the request signal S transmitted from the in-vehicle device 1.

In the following explanation, the request signal S to be transmitted from the transmission antenna 7a is defined as "request signal S1" and the request signal S to be transmitted from the transmission antenna 7b is defined as "request signal S2" for distinction. The LF transmitter 13 transmits the request signal S1 and the request signal S2 sequentially from the respective transmission antennas 7a and 7b. Here, an explanation will be made of an example where the request signal S1 is transmitted before the request signal S2, but the request signal S2 may be transmitted ahead of the request signal S1. A time interval may be set between the transmission from the transmission antenna 7a and the transmission from the transmission antenna 7b or one transmission is completed and immediately after that, the other transmission may be made without setting the time interval.

Figure 3:
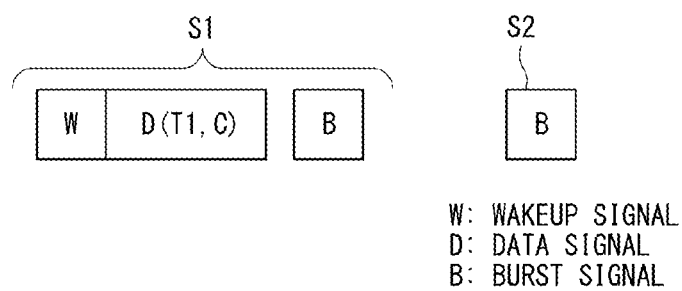
FIG. 3 is a diagram showing the configuration of a request signal.

FIG. 3 is a diagram showing the configuration of the request signals S1, S2 each. As shown in FIG. 3, the request signal S1 to be first transmitted from the transmission antenna 7a includes a wakeup signal W, a data signal D and a burst signal B. The data signal D includes a transmission completion time T1 and a cipher C, for example. The transmission completion time is a time required for completing transmission of all of the request signal S1 and the request signal S2. The burst signal B is a signal for measuring a reception strength in the portable device 3. The request signal S2 to be second transmitted includes the burst signal B only. It should be noted that the configuration of the request signals S1, S2 each in FIG. 3 is only shown as an example and may appropriately be modified to correspond to the purpose of communication.

The control unit 20 (refer to FIG. 2) certifies the answer signal concerning the reception of the answer signal from the portable device 3. The details will be described later, but the answer signal includes the process result of the cipher C included in the request signal S in the portable device 3 (hereinafter, referred to as "portable device-side process result"). The control unit 20 collates the portable device-side process result with the in-vehicle device-side process result stored in the memory 12. Since the portable device 3 executes the same calculation process as the cipher processor 23 in the in-vehicle device 1. If the answer signal is transmitted from the corresponding portable device 3, the process result becomes identical. When the portable device-side process result is the same as the in-vehicle device-side process result, the control unit 20 certifies that the answer signal is transmitted from the corresponding portable device 3. When the control unit 20 certifies the answer signal, the control unit 20 outputs a drive command to the actuator drive circuit 15. The actuator drive circuit 15 drives the door lock actuator 9 to unlock the door.

Figure 4:
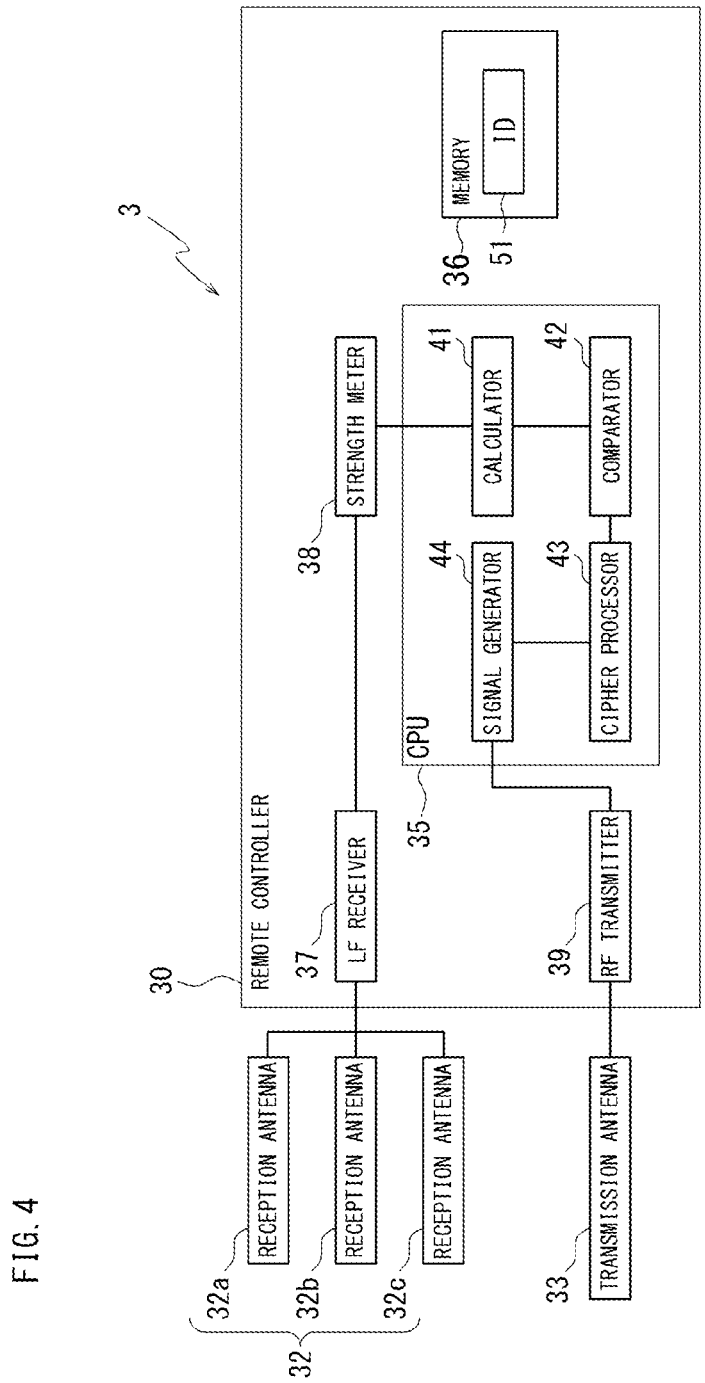
FIG. 4 is a block diagram showing the configuration of a portable device.

FIG. 4 is a block diagram showing the configuration of the portable device 3. As shown in FIG. 4, the portable device 3 is provided with a remote controller 30, a reception antenna 32 and a transmission antenna 33.

The reception antenna 32 receives the request signal S transmitted by the in-vehicle device 1. The transmission antenna 33 transmits the answer signal as the RF signal. The reception antenna 32 is a so-called three-axis antenna and is composed of three reception antennas 32a, 32b, 32c. The reception antennas 32a, 32b, 32c are respectively arranged to be orientated in axis directions perpendicular to each other as x axis, y axis and z axis (refer to FIG. 1). The reception antennas 32a, 32b, 32c detect a magnetic field of the request signal S as the LF transmitting wave to receive the request signal S. The reception antennas 32a, 32b, 32c are respectively arranged to be orientated in the axis directions perpendicular to each other, thereby causing magnetic field components detected by the reception antennas 32a, 32b, 32c respectively to differ from each other. It should be noted that an antenna of three or more axes may be used as the reception antenna 32, and the axis directions of the respective axes are not limited to crossing at right angles but may deviate by 45 degrees, for example.

As described before, since the request signals S1, S2 are respectively transmitted sequentially, the reception antenna 32 also receives the respective signals sequentially. The reception antennas 32a, 32b, 32c detect a component of each axis in the magnetic fields of the request signals S1, S2.

The remote controller 30 executes an after-mentioned process to the request signal S received via the reception antenna 32 to generate the answer signal. The remote controller 30 transmits the generated answer signal to the in-vehicle device 1 from the transmission antenna 33.

The remote controller 30 is provided with a CPU 35, an LF receiver 37, a strength meter 38, a RF transmitter 39 and a memory 36.

The LF receiver 37 is configured of a reception circuit and the like, and is connected to the reception antenna 32 to sequentially receive the request signal S transmitted by the in-vehicle device 1. The LF receiver 37 executes a process of analogue/digital conversion or the like to the request signal S.

The strength meter 38 is configured of, for example, a RSSI (Received Signal Strength Indication) circuit and the like. The strength meter 38 measures a reception strength of the burst signal B included in each of the request signals S1, S2 received by the LF receiver 37. As described before, since the request signals S1, S2 are received by each axis of the reception antennas 32a, 32b, 32c orientated in the directions perpendicular to each other, the strength meter 38 measures three-dimensional reception strengths of the request signals S1, S2. The strength measurement unit 38 stores the measured reception strengths of the request signals S1, S2 in the memory 36.

The RF transmitter 39 outputs the answer signal as a RF signal from the transmission antenna 33. The memory 36 stores therein control programs of the remote controller 30 and information necessary for the process of the remote controller 30. The memory 36 stores therein ID51 of the portable device 3 as an example.

The CPU 35 executes integral control of the remote controller 30. Particularly, as the functional arrangement for executing the process to the request signal S, the CPU 35 is provided with a calculator 41, a comparator 42, a cipher processor 43 and a signal generator 44.

As similar to the in-vehicle device 1, each part of the CPU 35 causes the process result to be temporarily stored in the memory 36, and reads out the necessary data and the process target from the memory 36 and resets the data temporarily stored after process completion. For example, as described before, the reception strength measured by the strength meter 38 is stored in the memory 36, but when the transmission of the answer signal in response to the received request signal S is completed, the CPU 35 deletes the reception strength from the memory 36.

It should be noted that the detailed explanation is omitted, but the portable device 3 may be structured to be provided with a control switch. When a user operates the control switch, it is possible to lock or unlock a door of a vehicle, or start an engine remotely.

The calculator 41 and the comparator 42 execute the determination process of the relay attack to the request signals S1, S2. The calculator 41 uses the reception strengths of the request signals S1, S2 measured by the strength meter 38 to calculate reception strength ratios (hereinafter, simply also referred to as "strength ratio") of three axes, that are, x axis, y axis and z axis concerning each of the request signals S1, S2. The comparator 42 executes a comparative process between the strength ratio of the request signal S1 and the strength ratio of the request signal S2 to perform a determination of the relay attack.

FIG. 5 is a diagram showing an example of a strength ratio of each of the request signals S1, S2 transmitted from the transmission antennas 7a, 7b respectively.

As described before, the transmission antennas 7a, 7b as transmission sources of the request signal S are installed in the different positions in the vehicle V and differ in a distance and a direction to the portable devices 3 respectively. Therefore, as shown in FIG. 5, regarding the request signals S1, S2 transmitted from the transmission antennas 7a, 7b, magnetic field components of the respective axes measured by the reception antennas 32, 32b, 32c of the portable device 3 (refer to FIG. 4) differ between the request signals S1, S2. Therefore, as a result, the strength ratio of the request signal S1 is made different from the strength ratio of the request signal S2. The strength ratios calculated about the request signal S1 and the request signal S2 indicate a difference in an orientation of vector between the respective request signals S1, S2.

On the other hand, in a case where the request signal S is relayed by the relay device of performing the relay attack, there is a high possibility that every strength ratio of the request signal S is the same.

FIG. 6 is a diagram showing a mechanism of the relay attack.

As shown in FIG. 6, a third person trying an illegal unlock of a door in the vehicle V operates the request switch 5a when a user of the portable device 3 is distant from the vehicle V. The in-vehicle device 1 transmits the request signal S in response to the operation of the request switch 5a. The plurality of relay devices, which are installed between the portable device 3 and the vehicle V and each are provided with an antenna, relay this request signal S so that the portable device 3 in a distant place receives the request signal S.

When the portable device 3 sends back the answer signal to the request signal S transmitted by this relay device, the door is unlocked illegally. For preventing it, the in-vehicle device 1 transmits the request signals S1, S2 from the transmission antennas 7a, 7b installed in the different positions, and the portable device 3 executes the process for comparing the strength ratios of the request signals S1, S2.

As described before, in a case where the portable device 3 appropriately receives the request signals S1, S2 transmitted by the transmission antennas 7a, 7b installed in the different positions in the in-vehicle device 1 without via the relay device, the calculated strength ratio differs between the request signals S1, S2.

On the other hand, in a case where the request signals S1, S2 are relayed by the relay device, the portable device 3 receives each of the request signals S1, S2 transmitted from a single antenna of the relay device. Therefore, the vector orientation of the request signal S1 is identical to that of the request signal S2, and even in a case where the transmission antennas 7a, 7b differ in a transmission source, the strength ratio becomes identical between the request signals S1, S2 to be received by the portable device 3.

The comparator 42 executes the comparative process for the strength ratios of the request signals S1, S2 calculated in the calculator 41. The portable device 3 does not send back the answer signal to the in-vehicle device 1 when the comparator 42 determines that the strength ratios are the same, which prevents the portable device 3 from being subjected to the relay attack.

However, the strength meter 38 configured of the RSSI circuit and the like has limitation to a range of the reception strength which can be measured accurately and usable for the calculation of the strength ratio (hereinafter, referred to as "usable range"). That is, in a case where an actual reception strength of each of the request signals S1, S2 deviates from this usable range, it may be possible that the actual reception strength is not appropriately measured by the strength meter 38. In this case, the strength ratio measured in the calculator 41 does not reflect the actual reception strength, which may affect the determination of the relay attack.

Figure 7A:
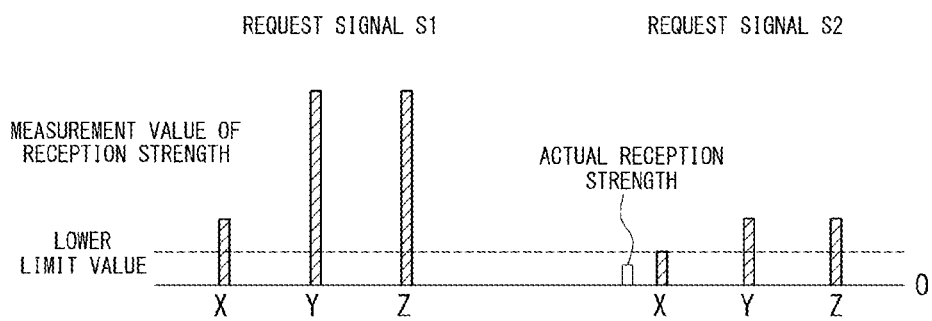
FIGS. 7A, 7B and 7C are diagrams each showing a case where a reception strength in x axis of the request signal is a lower limit value in a measurement possible range at the relay attack.
Figure 7B:
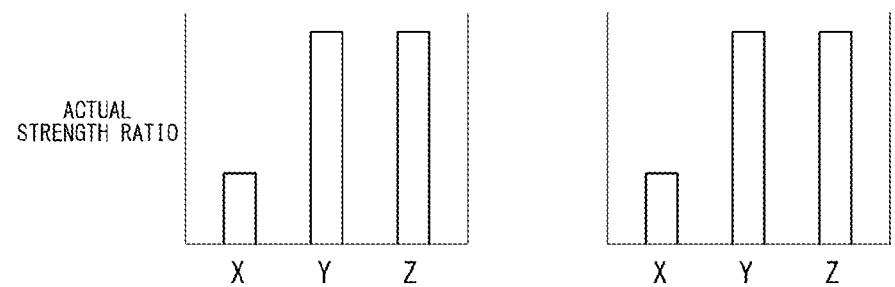
Figure 7C:
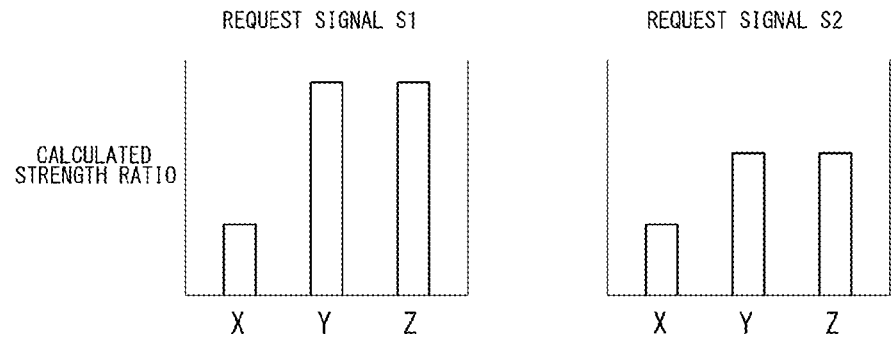

FIG. 7A is a diagram showing an example of measurement values of reception strengths of the request signal S at the relay attack, FIG. 7B shows actual strength ratios, and FIG. 7C shows calculated strength ratios.

FIG. 7A shows a case where the request signals S1, S2 are transmitted from the relay device by the relay attack but the reception strength of the request signal S2 is weakened due to, for example, noises or the like.

Since each reception strength of the three axes in the request signal S1 is all within the usable range, the measurement value reflects the actual reception strength. On the other hand, the reception strength of each of y axis and z axis in the request signal S2 is within the usable range, but an actual reception strength of x axis in the request signal S2 is, as shown in a broken line, below the usable range. In this case, the measurement value outputted as the reception strength of x axis differs depending on performance or a specification of the strength meter 38. For example, as shown in FIG. 7A, there may be a case where a value below a lower limit value of the usable range is not outputted as the measurement value and the measurement value sticks to the lower limit value. Alternatively, there may be a case where the value below the lower limit value of the usable range is outputted as the measurement value, though, it differs from the actual reception strength. In any case, the measurement value to be outputted does not reflect the actual reception strength accurately.

As shown in FIG. 7B, the strength ratio of each axis of the actual reception strength becomes the same between the request signals S1, S2. However, as shown in FIG. 7C, when the strength ratio is calculated from the measurement value of the strength meter 38, since x axis of the request signal S2 sticks to the lower limit value, the strength ratios of the request signals S1, S2 differ from each other. In a case of using such strength ratios, There is a possibility that the comparator 42 cannot execute the comparative process appropriately.

For preventing from such affection to the comparative process by deviation of the reception strength in part of the axes from the usable range, the present embodiment determines the axis where the measurement value of the reception strength deviates from the usable range as the ineffective axis of the three axes. The present embodiment excludes the ineffective axis and executes the comparative process of the strength ratios. The usable range of the measurement value is in advance set by conducting tests or simulations and is stored in the memory 36. For example, in a case where the strength meter 38 can obtain 0 to 1023 of the 10 bits as the measurement value, the usable range of the measurement value can be set as 100 to 800. The details of each process of the calculator 41 and the comparator 42 will be described later.

Back to FIG. 4, in a case where it is determined to be capable of transmitting the answer signal as a result of the comparative process in the comparator 42, the cipher processor 43 processes/calculates the cipher C (refer to FIG. 3) included in the data signal D of the request signal S1 by a predetermined calculation process. The predetermined calculation process incorporates therein ID51 of the portable device 3, and is the same calculation process as the cipher processor 23 in the in-vehicle device 1. The cipher processor 43 inputs the portable device-side process result into the signal generator 44.

The signal generator 44 generates the answer signal including the portable device-side process result, which is sent to the RF transmitter 39. The RF transmitter 39 outputs the answer signal as a RF signal from the transmission antenna 33.

Hereinafter, the process of the keyless entry system will be explained separately on the in-vehicle device 1-side and the portable device 3-side.

Figure 8:
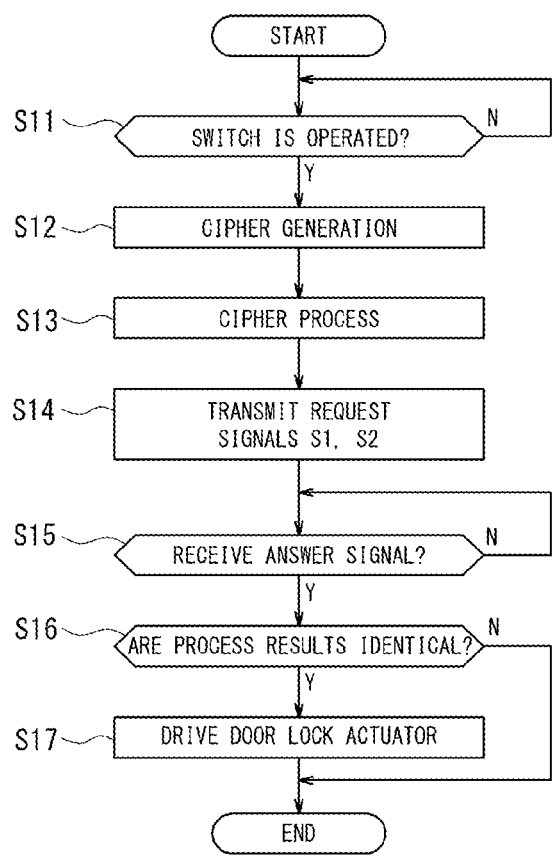
FIG. 8 is a flow chart showing a process of the in-vehicle device.

FIG. 8 is a flow chart showing the process of the in-vehicle device 1.

As shown in FIG. 8, when any of the request switches 5a, 5b, 5c is operated by a user (step S11: Yes), the switch determiner 21 determines which switch is operated and causes the operated switch to be stored in the memory 12.

The control unit 20 generates a cipher C caused to be included in the request signal S (step S12). The control unit 20 inputs a process command together with the generated cipher C into the cipher processor 43. The control unit 20 inputs a signal generating command together with the cipher C into the signal generator 22.

The cipher processor 43 processes/calculates the cipher C by the predetermined calculation process according to a process command, and the in-vehicle device-side process result is stored in the memory 12 (step S13).

The signal generator 22 generates the request signal S according to the signal generating command and controls the LF transmitter 13 to cause the request signals S1, S2 to be transmitted from the transmission antennas 7a, 7b respectively (step S14)

The control unit 20 waits for the answer signal from the portable device 3 when the transmission of the request signals S1, S2 is completed (step S15). It should be noted that the control unit 20 refers to a timer, and in a case where the answer signal is not received even after a predetermined response waiting time elapses, completes the process.

When the control unit 20 receives the answer signal (step 15: Yes), the control unit 20 collates the portable device-side process result included in the answer signal with the in-vehicle device-side process result stored in the memory 12 (step S16). The control unit 20, in a case where the portable device-side process result is not identical to the in-vehicle device-side process result (step S16: No), completes the process. The control unit 20, in a case where the portable device-side process result is identical to the in-vehicle device-side process result (step S16: Yes), outputs a drive command to the actuator drive circuit 15. The actuator drive circuit 15 drives the door lock actuator 9 (step S17) to release the door lock.

Figure 9:
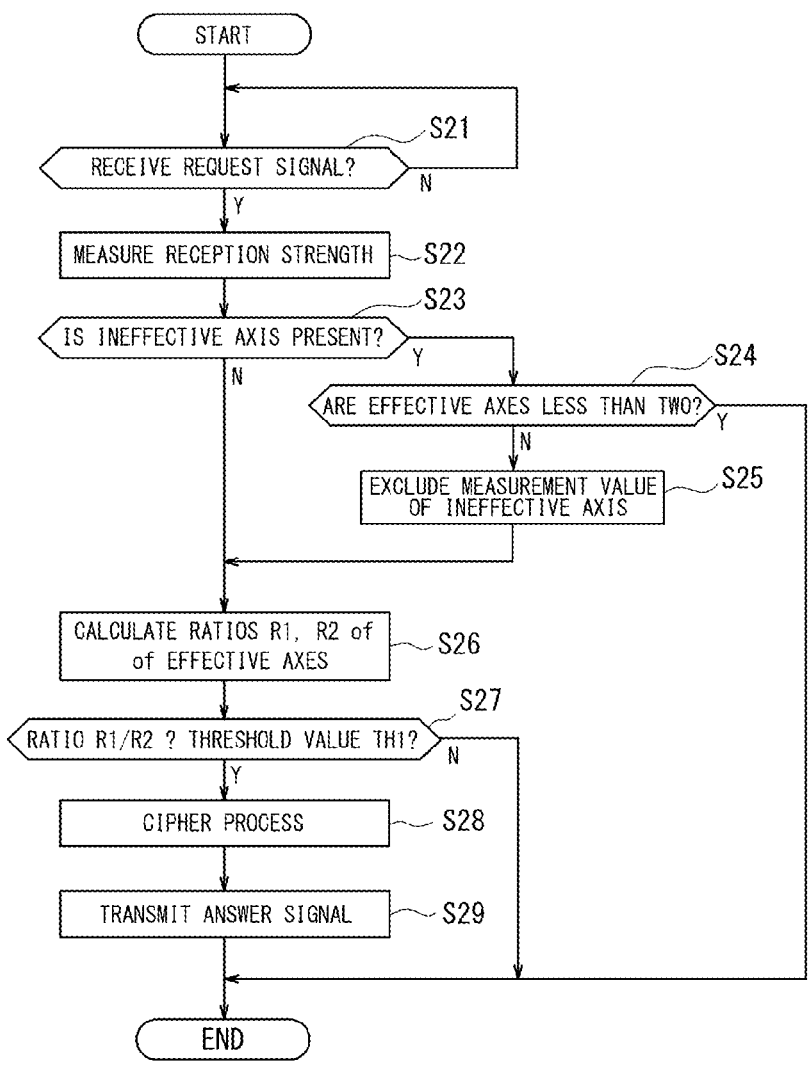
FIG. 9 is a flow chart showing a process of the portable device.

FIG. 9 is a flow chart showing the process of each of the request signals S1, S2 in the portable device 3.

The remote controller 30 in the portable device 3 is kept in a sleep mode until the request signal S is received except for a case where the control switch of the portable device 3 is operated. As shown in FIG. 9, when the remote controller 30 receives the request signal S (step S21: Yes), the remote controller 30 releases the sleep mode. Specifically the sleep mode is released in response to a wakeup signal W included in the request signal S first received in the portable device 3.

The remote controller 30 refers to a transmission completion time T1 included in the data D of the request signal S1 and also receives the request signal S2 transmitted within the transmission completion time T1 following the request signal S1.

The strength meter 38 sequentially measures the reception strength of each axis of x axis, y axis, z axis in the magnetic field of each of the received request signals S1, S2 (step S22) and causes the reception strengths to be stored in the memory 36.

The calculator 41 obtains the measurement value of the reception strength of each axis in each of the request signals S1, S2 stored in the memory 36 and determines whether there is an ineffective axis among them (step S23).

As described before, the ineffective axis is the axis in which the reception strength of each of the request signals S1, S2 deviates from the usable range. A specific determination process of the ineffective axis is determined in response to the performance or the specification of the strength meter 38. For example, FIG. 7A shows a specification that, in a case where the reception strength deviates from the usable range, the measurement value of the strength meter 38 sticks to the upper limit value or the lower limit value. In this case, the calculator 41 determines the axis, in which the measurement value shows the upper limit value or the lower limit value, as the ineffective axis. For example, in a case where the usable range of the measurement value of the strength meter 38 is a range of 100 to 800, the calculator 41 determines the axis, in which the measurement value shows 100 (the lower limit value) or 800 (the upper limit value), as the ineffective axis.

Alternatively, when the strength meter 38 outputs a value out of the usable range, the calculator 41 determines the axis, in which the measurement value shows the value out of the usable range, as the ineffective axis. For example, in a case where the usable range of the measurement value of the strength meter 38 is a range of 100 to 800, the calculator 41 determines the axis, in which the measurement value shows a value 95, 901 or the like, which is out of the usable range, as the ineffective axis.

When the reception strength of at least one of the request signals S1, S2 deviates from the usable range, the calculator 41 determines the axis as the ineffective axis. When both of the request signals S1, S2 are within the usable range, the calculator 41 determines the axis as the effective axis. In an example in FIG. 7A, x axis becomes the ineffective axis, and y axis and z axis become the effective axes.

As shown in FIG. 9, the calculator 41 goes to calculation of the strength ratio at step S26 in a case where there is no ineffective axis (step S23: No).

In a case where there is the ineffective axis (step S23: Yes) and there are less than two effective axes (step S24: Yes), the process ends, since the calculator 41 cannot perform the calculation of the strength ratio.

In a case where there are two or more effective axes (step S24: Yes), the calculator 41 can perform the calculation of the strength ratio. The calculator 41 excludes the measurement value of the ineffective axis (step S25) and goes to step S26. At step S26, the calculator 41 calculates respective strength ratios R1, R2 of the request signals S1, S2 from the measurement value of the reception strength of the effective axis.

The comparator 42 executes the comparative process using the strength ratios R1, R2 of the request signals S1, S2 calculated in the calculator 41 to determine whether the strength ratios are the same, that is, whether the relay attack occurred.

The comparative process is not limited to a particular method, but as an example, the comparator 42 calculates a ratio R1/R2 of a strength ratio R1 of request signal S1 and a strength ratio R2 of request signal S2 and compares the ratio R1/R2 with a threshold value TH1 (step S27).

As described before, when the request signals S1, S2 are transmitted from the same relay device, the respective strength ratios R1, R2 are assumed to be the same. However, in some cases the strength ratios of the request signals S1, S2 do not become completely the same due to noises or the like. Therefore, even when there is a difference in the strength ratio between the request signals S1, S2, as far as the difference is within a range where the transmission source can be determined to be the same, the comparator 42 determines the relay attack.

Therefore, the comparator 42 calculates the ratio R1/R2 as a value showing the difference in the strength ratio between the request signals S1, S2, and compares the ratio R1/R2 with the threshold value TH1. The threshold value TH1 is a reference value for determining that the transmission source is the same, and is in advance set. The threshold value TH1 is not limited, but for example, can be set as 10%.

It should be noted that when the three axes all are the effective axes, the calculator 41 calculates x/y, x/z and y/z, as the strength ratios R1, R2 of the request signals S1, S2. The comparator 42 selects the maximum value of the ratio R1/R2 and compares the maximum value with the threshold value TH1.

In addition, when the measurement value of the ineffective axis is excluded, the strength ratio of the effective axis is used. For example, in a case where x axis is the ineffective axis, the ratio R1/R2 calculated from the strength ratio y/z of y axis and z axis as the effective axis is compared with the threshold value TH1.

When the ratio R1/R2 is less than the threshold value TH1 (step S27: No), there is a possibility of the relay attack. The comparator 42 determines the transmission of the answer signal as impossible and ends the process. When the ratio R1/R2 is equal to or more than the threshold value TH1 (step S27: Yes), the comparator 42 determines the transmission of the answer signal as possible and inputs the determination result into the cipher processor 43.

When the process result is inputted into the cipher processor 43 from the comparator 42, the cipher processor 43 obtains the cipher C included in the data D of the request signal S1 and calculates the cipher C by a predetermined calculation process (step S28) and inputs the calculated portable-device side process result into the signal generator 44. The signal generator 44 generates an answer signal including the portable-device side process result. The signal generator 44 controls the RF transmitter 39 to transmit the answer signal from the transmission antenna 33 (step S29).

The remote controller 30 returns back to the sleep state from the usual operation state after sending back the answer signal, and the process ends.

As described above, the relay attack determination device according to the embodiment:

(1) determines that wireless communications between the in-vehicle device 1 and the portable device 3 are relayed by the relay device, the so-called relay attack.

The relay attack determination device includes: the LF transmitter 13 (transmitter) disposed on the in-vehicle device 1, the LF transmitter 13 being configured to transmit the request signal S1 (first signal) and the request signal S2 (second signal) having the output position (output condition) different from the output position in the request signal S1; the LF receiver 37 (receiver) disposed on the portable device 3 and including the reception antenna 32 (antenna) of the three axes (plural axes) respectively oriented in the different directions to receive the request signal S1 and the request signal S2 in each of the three axes;

the strength meter 38 disposed on the portable device 3 to measure the reception strength of the request signal S1 to the request signal S2 received by each of the three axes of the LF receiver 37; and the comparator 42 (comparator, determiner) configured to execute the comparative process of the strength ratios (reception strength ratio) of the request signal S1 and the request signal S2 based upon the measurement value of the reception strength and determine the relay attack based upon a result of the comparative process.

In a case where the three axes include an ineffective axis, in which the measurement value of the reception strength of the request signal S1 or the request signal S2 deviates from the usable range excludes the ineffective axis and executes the comparative process.

Specifically, in a case where the three axes include the ineffective axis, the comparator 42 executes the comparative process about the reception strength ratio of the effective axes left by excluding the ineffective axis.

In the keyless entry system, for coping with the relay attack, the in-vehicle device 1 transmits the request signals S1, S2 from the transmission antennas 7a, 7b arranged in the different positions and the portable device 3 measures the three-dimensional reception strength of each of the request signals S1, S2 received in the reception antenna 32 composed of the three axes of the antennas 32a, 32b, 32c.

When the request signals S1, S2 are transmitted via the single relay device by the relay attack, the strength ratios R1, R2 of the request signals become the same one. Therefore, the comparator 42 of the portable device 3 executes the comparative process of the strength ratios R1, R2 to perform the determination of the relay attack.

However, in a case where the reception strength deviates from the usable range of the strength meter 38, in some cases the measurement value different from the actual reception strength is shown. In this case, the strength ratios R1, R2 of the request signals S1, S2 calculated in the calculator 41 are also made different, and therefore, there is a possibility that the determination of the relay attack cannot be made appropriately.

Therefore, in the embodiment, in a case where the ineffective axis, in which the measurement value of the reception strength of the request signal S1 or the request signal S2 deviates from the usable range, is present in the three axes, the comparator 42 excludes the ineffective axis and executes the comparative process about the strength ratio of the effective axis. Thereby, the determination of the relay attack can appropriately be made to improve the security of the vehicle.

It should be noted that as described before, the specific aspect of "the measurement value of the reception strength deviates from the usable range" is determined based upon the performance or the specification of the RSSI circuit configuring the strength meter 38 or the like. For example, "the measurement value deviates from the usable range" means a case where the measurement value becomes the lower limit value or the upper limit value of the usable range or a case where the measurement value becomes the value out of the usable range.

[Modification 1]

Figure 10:
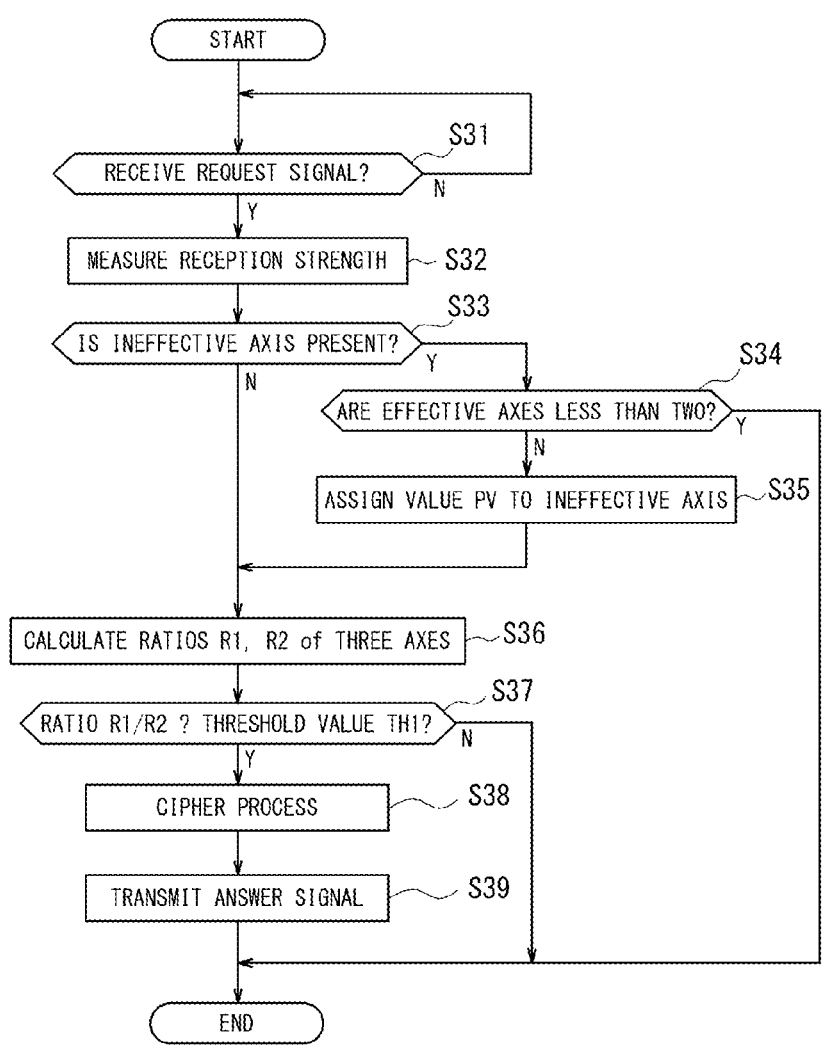
FIG. 10 is a flow chart showing a process of a portable device according to Modification 1.

FIG. 10 is a flow chart showing the process of the portable device 3 according to Modification 1.

In the embodiment the calculator 41 excludes the ineffective axis in which the measurement value of the request signal S1 or the request signal S2 deviates from the usable range and calculates the strength ratio of the remaining effective axis (refer to step S23 to step S26 in FIG. 9).

As shown in FIG. 10, in Modification 1, the calculator 41 assigns a preset value PV to the measurement value of the ineffective axis instead of excluding the ineffective axis (step S35).

The calculator 41 assigns a value "0" to the measurement value of the ineffective axis in each of the request signal S1 and request signal S2.

The calculator 41 assigns the value "0", and thereafter, calculates the strength ratios of the three axes at step S36. Since the value "0" is assigned to the measurement value of the ineffective axis in each of the request signal S1 and request signal S2, the strength ratio including the ineffective axis becomes an ineffective value. The above calculation of the three axes is substantially the same as the calculation excluding the ineffective axis. As a result, the comparative process is executed about the strength ratio of the effective axis excluding the ineffective axis in the comparator 42, and therefore, an appropriate relay attack determination is made possible in the same way as the embodiment.

Since the other process in Modification 1 is the same as the process in the embodiment, the explanation is omitted.

As described above, in Modification 1, (2) in a case where the three axes include the ineffective axis, the comparator 42 replaces the measurement values of the request signal S1 and the request signal S2 of the ineffective axis by "0" as the preset value and executes the comparative process using the strength ratios R1, R2 calculated by using the preset value.

Thereby, the determination of the relay attack can be made appropriately without affection of the measurement value of the ineffective axis in the same way as the embodiment. It should be noted that in Modification 1 "0" is used as the preset value, but another value approximate to "0" may be used.

[Modification 2]

Figure 11:
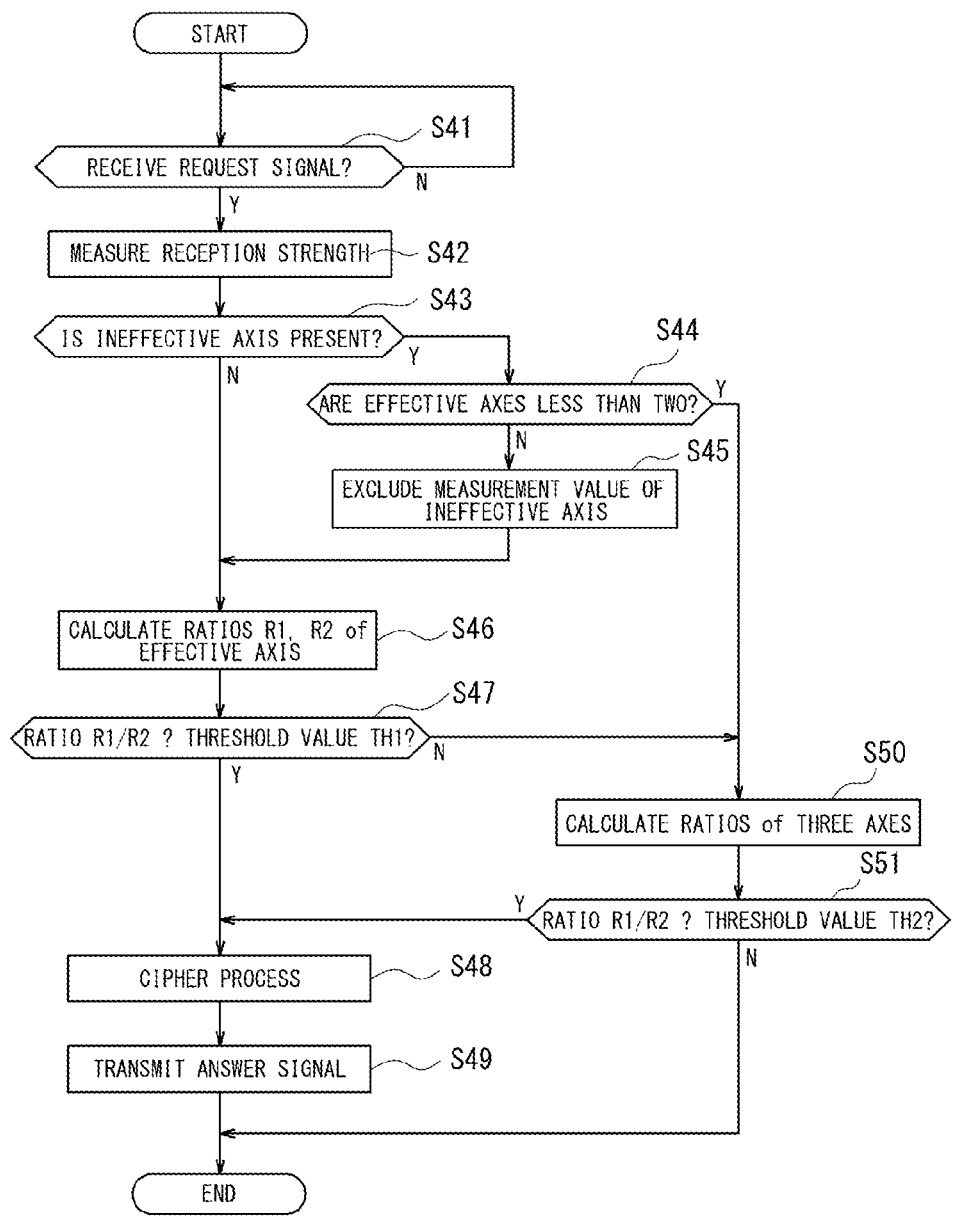
FIG. 11 is a flow chart showing a process of a portable device according to Modification 2.

FIG. 11 is a flow chart showing the process of the portable device 3 according to Modification 2.

In the embodiment, as shown in FIG. 9, the explanation is made of the example where in a case where there are less than two effective axes among the three axes (step S24: Yes), the strength ratio of the effective axis cannot be calculated and therefore, the process ends without executing the comparative process.

In Modification 2, even in a case where there are less than two effective axes, the calculation of the strength ratio including the ineffective axis is made, and the comparative process with a threshold value TH2 greater than the threshold value TH1 is executed.

As shown in FIG. 11, in a case where there are less than two effective axes among the three axes at step S44, the calculator 41 calculates the strength ratios R1, R2 of the three axes including the ineffective axis about the request signals S1, S2 respectively (step S50).

The comparator 42 calculates the ratio R1/R2 of the strength ratios R1, R2 of the request signals S1, S2, and compares the ratio R1/R2 with the threshold value TH1 (step S51). As described before, x/y, x/z and y/z are calculated as the strength ratios of the three axes. The comparator 42 selects the maximum value of the ratio R1/R2 as a comparative target with the threshold value TH2 from them. The threshold value TH2 can be set as 50% in a case where the threshold value TH1 is 10%, for example.

When the ratio R1/R2 of the strength ratios R1, R2 of the request signals S1, S2 is equal to or more than the threshold value TH2 (step S51: Yes), the comparator 42 determines the transmission of the answer signal as possible and inputs the determination result into the cipher processor 43 to execute the cipher process in the same way as the embodiment. When the ratio R1/R2 is less than the threshold value TH2 (step S51: No), the comparator 42 determines the transmission of the answer signal as impossible and the process ends.

In the processes of step S46 to step S47, the strength ratios R1, R2 of the effective axis are calculated as similar to step S26 to step S27 in the embodiment, and the ratio R1/R2 is compared with the threshold value TH1. Here, in Modification 2, when the ratio R1/R2 is less than the threshold value TH1 (step S47: No), the process goes step S50, wherein the strength ratios R1, R2 of the three axes are calculated, and the process goes to the comparative process between the ratio R1/R2 and the threshold value TH2 (step S51).

When the ratio R1/R2 is equal to or more than the threshold value TH1 (step S47: Yes), the cipher process of step S48 is executed in the same way as the embodiment.

Since the other processes in Modification 2 are the same as those in the embodiment, the explanation is omitted.

FIGS. 12A and 12B are diagrams explaining the concept of the comparative process in Modification 2. FIG. 12A shows an example of measurement values of reception strengths of three axes and FIG. 12B is a diagram showing a positional relation between the transmission antennas 7a, 7b and the portable device 3.

In FIG. 12A, the measurement value of the request signal S1 shows the lower limit value in x axis and the measurement value of the request signal S2 shows the lower limit value in y axis. The measurement value of each of the request signals S1, S2 shows the lower limit value in z axis. That is, FIG. 12A shows a case where the three axes are all determined as the ineffective axes. However, the measurement value of the request signal S2 in x axis is very high, and differs largely from the measurement value of the request signal S1 as the lower limit value. Similarly, the measurement value of the request signal S1 in y axis is very high, and differs largely from the measurement value of the request signal S2 as the lower limit value.

As a case where the reception strength shows this tendency, for example, as shown in FIG. 12F, it is assumed that the transmission antennas 7a, 7b of the in-vehicle device 1 and the portable device 3 are positioned on the same line segment L1, while the transmission antennas 7a, 7b has a positional relation to be perpendicular to each other.

In this case, as shown in FIG. 12(a), the strength ratio x/y of x axis and y axis differs largely between the request signals S1, S2. For example, when the strength ratio x/y of the request signal S1 is assumed as 0.1 and the strength ratio x/y of the request signal S2 is assumed as 10, both of them differ by 10000% and exceeds 50% of the threshold value TH2.

In this case, there are less than two effective axes, though, the measurement values of the request signal S1 or the request signal S2 in at least two axes are very high and the strength ratios R1, R2 of the two axes differ largely. In such case, there is a low possibility that the request signals S1, S2 are relayed by the relay device. The answer signal may be transmitted for the convenience.

Therefore, in Modification 2 in a case where there are two or more ineffective axes, the strength ratios R1, R2 of the three axes including the ineffective axis are calculated, and the maximum ratio R1/R2 is compared with the threshold value TH2 set larger than the threshold value TH1 to perform the determination of the relay attack. Thereby, the possibility of being capable of transmitting the answer signal is increased.

In addition, in Modification 2 also in a case where the strength ratio R1/R2 is less than the threshold value TH1 in the comparative process with the threshold value TH1 (step S47: No), the process goes to the comparative process with the threshold value TH2 (step S50 to S51). Thereby, in the comparative process of the threshold value TH1 using the effective axis, even in a case incapable of determining the transmission of the answer signal as possible, when there is a large difference between the strength ratios R1, R2 calculated including the ineffective axis, it is possible to transmit the answer signal.

As described above, in Modification 2, (3) the comparator 42 compares, in a case where the three axes include two or more effective axes, the ratios R1/R2 in the effective axis with the threshold value TH1 (first threshold value). The ratios R1/R2 indicates a difference between the strength ratio R1 of the request signal S1 and the strength ratio R2 of the request signal S2. In addition, the comparator 42 compares, in a case where the three axes include less than two effective axes, the ratios R1/R2 showing a difference between the strength ratios R1, R2 of the request signal S1 and the request signal S2 in the three axes with the threshold value TH2 (second threshold value) greater than the threshold value TH1.

Specifically the comparator 42 compares, in a case where the ratio R1/R2 showing the difference between the strength ratios R1, R2 of the request signal S1 and the request signal S2 in the effective axis is less than the threshold value TH1 in the comparative process with the threshold value TH1, the ratio R1/R2 with the threshold value TH2.

As a result, even in a case where the effective axis is not composed of two or more axes, when there are two axes the strength ratios of which differ largely, it is possible to determine that the transmission of the answer signal is made possible, and user's convenience is high.

It should be noted that in the above example, the ratio R1/R2 showing the difference in the reception strength ratio is calculated as percentage (%), and the threshold values TH1, TH2 are also expressed using percentage (%), which are not limited thereto. For example, the difference in the reception strength ratio may be expressed by finding a cosine value (cos ϕ) of an angle (ϕ) in vector between the respective signals from the reception strengths.

In addition, the second threshold value is only required to show that "the difference in the reception strength ratio between the request signals S1, S2 is substantially greater than the first threshold value", and for example, in some cases the second threshold value is smaller than the first threshold value in an actual value depending upon a calculation method of the above-described cosine value (cos ϕ) or the like.

[Modification 3]

Figure 13:
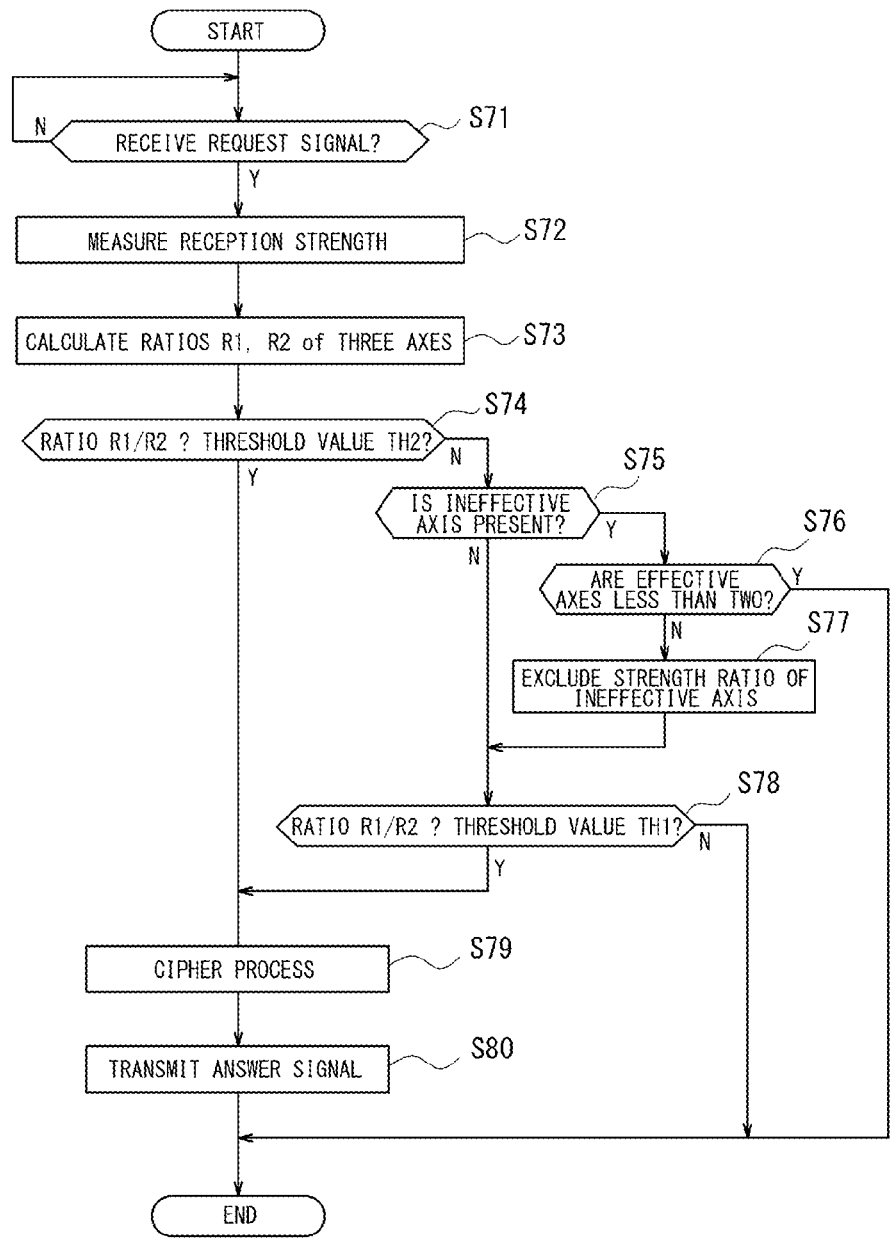
FIG. 13 is a flow chart showing a process of an in-vehicle device according to Modification 3.

FIG. 13 is a flow chart showing a process of the portable device 3 according to Modification 3.

Modification 3 adds the comparative process between the ratio R1/R2 and the threshold value TH2 as similar to Modification 2, but the comparative process with the threshold value TH2 is executed ahead of the comparative process with the threshold value TH1.

As shown in FIG. 13, after the strength meter 38 measures the reception strength of each axis of the request signals S1, S2 (step S71 to S72), the calculator 41 calculates the strength ratios R1, R2 of the three axes about the request signals S1, S2 without performing the determination of the ineffective axis (step S73). The comparator 42 compares the maximum ratio R1/R2 from the calculated strength ratios R1, R2 of the three axes with the threshold value TH2 (step S74). The comparator 42 determines, in a case where the ratio R1/R2 is equal to or more than the threshold value TH2 (step S74: Yes), the transmission of the answer signal as possible, and the process goes to the cipher process of step S79.

The comparator 42 executes, in a case where the ratio R1/R2 is less than the threshold value TH2 (step S74: No), the comparative process with the threshold value TH1 about the strength ratios R1, R2 of the effective axis in the same way as the embodiment.

That is, the comparator 42 refers to the measurement value of the reception strength in each axis to determine whether there is the ineffective axis (step S75).

The comparator 42 goes to step S78 in a case where there is no ineffective axis (step S75: No). In a case where there is the ineffective axis (step S75: Yes) and in a case where there are less than the two effective axes (step S76: Yes), the process ends.

The comparator 42, in a case where the effective axis is composed of two or more axes (step S76: No), excludes the strength ratio including the ineffective axis (step S77), and process goes to step S78.

At step S78, the comparator 42, as similar to the embodiment, calculates a ratio R1/R2 of the strength ratio R1 of the request signal S1 and the strength ratio R2 of the request signal S2, and compares the ratio R1/R2 with the threshold value TH1. It should be noted that in a case where the three axes all are the effective axes, the comparator 42 selects the maximum value of the calculated ratios R1/R2 and compares the maximum value with the threshold value TH1. In a case where the strength ratio of the ineffective axis is excluded, the ratio R1/R2 is calculated from the strength ratio of the effective axis, which is compared with the threshold value TH1.

As described above, in the keyless entry system according to Modification 3, (4) the comparator 42 compares the ratio R1/R2 showing the difference between the strength ratios R1, R2 of the request signal S1 and the request signal S2 in the three axes with the threshold value TH2, the comparator 42 compares, in a case where the ratio R1/R2 is less than the threshold value TH2, the ratio R1/R2 with the threshold value TH1 smaller than the threshold value TH2, and the comparator 42 excludes, in a case where there is the ineffective axis, in which the measurement value of the reception strength of the request signal S1 or the request signal S2 deviates from the usable range, of the three axes in the comparative process with the threshold value TH1, the ineffective axis.

In this case, according to Modification 3, in the same way as Modification 2, even in a case where the effective axis is not composed of two or more axes, when there are two axes the strength ratios R1, R2 of which differ largely, it is possible to determine the transmission of the answer signal as possible, and user's convenience is high. In addition, since the comparative process with the threshold value TH2 is executed before the determination of the ineffective axis, in a case where the strength ratios R1, R2 of the request signals S1, S2 differ largely, it is possible to quickly determine the transmission of the answer signal as possible. Therefore, the process efficiency can be improved.

[Other Modifications]

In the above-mentioned embodiment, there is explained the example in which the process corresponding to the determination of the relay attack is executed on the portable device 3-side, but not limited thereto, the determination of the relay attack may be made on the in-vehicle device 1-side.

For example, the portable device 3 may perform only the measurement of the reception strength in each of the request signals S1, S2 and transmit the measurement value to the in-vehicle device 1 with being included in the answer signal. The in-vehicle device 1 may determine the relay attack by executing the comparative process or the like based upon the received measurement value and control the operation of the in-vehicle equipment, of the door lock or the like corresponding to the determination result. Alternatively the process may be executed to the comparative process on the portable device 3-side and the process result may be transmitted to the in-vehicle device 1. That is, the functional arrangement of the comparator and the determiner may be realized in any of the CPU 11 in the in-vehicle device 1 and the CPU 35 in the portable device 3.

The in-vehicle device 1 may end the process without releasing the door lock in a case where the relay attack is determined. In addition, a warning device such as a buzzer or a lamp may be disposed in the in-vehicle device 1, and in a case where the relay attack is determined, a warning is outputted from this device.

In the above-mentioned embodiment, there is explained the example in which the request signals S1, S2 respectively are transmitted from the two transmission antennas 7a, 7b of the in-vehicle device 1 and the relay attack is determined by comparing the strength ratios of the respective signals received on the portable device 3-side. However, the request signal S may be composed of a plurality of request signals output conditions of which are made different to be capable of determining the relay attack and the transmission aspect of the request signal S can be modified as needed.

"Output conditions are made different" includes, for example, "output positions are made different" by arranging the transmission antennas 7a, 7b in different positions in the same way as the embodiment, and besides, includes "output directions are made different" and "output timings are made different" as well.

In a case where "output directions are made different", for example, the transmission antennas 7a, 7b may be arranged in the same position, wherein orientations of the transmission antennas are made different. Further, the request signals S1, S2 may be transmitted from a single transmission antenna 7 with making orientations of magnetic fields of the request signals S1, S2 different. As a result, since the output directions of the request signals S1, S2 are made different, orientations in vector between the respective signals are also made different. As a result, the determination of the relay attack can be made by comparing reception strength ratios in the portable device 3.

The transmission antenna 7 may include three or more antennas and transmit request signals from the respective antennas. For example, in addition, the transmission number of times of the request signal S is not limited to twice, but the request signal S may be transmitted by three or more times. Further, in a state where a single request signal S is successively outputted, the strength may be made different and the orientation of the magnetic field may be changed on the way.

In recent years, there is an aspect of a relay attack in which at the time of relaying a request signal S an output direction thereof is made different by swinging a relay device to change a reception strength ratio in the portable device 3. As a further measure coping with such an aspect, after transmitting request signals S1, S2 from the transmission antennas 7a, 7b in the in-vehicle device 1 respectively, a request signal S3 having the same strength as the request signal S1 is further outputted from the transmission antenna 7a. That is, the request signal S is transmitted so as to "make the output timing different".

In a case where the request signal S is appropriately received in the portable device 3, the strength ratio of the request signal S1 is made different from the strength ratio of the request signal S2, and the strength ratio of the request signal S1 is the same as the strength ratio of the request signal S3. On the other hand, in a case where the request signals S1, S2, S3 are relayed by swinging the relay device, since all the strength ratios of the request signals S1, S2, S3 are different, it is possible to determine the relay attack.

In the comparative process using the above-mentioned threshold values TH1, TH2, the comparative target is "a threshold value or more", or "less than a threshold value" is used as a reference, but either the comparative target is "greater than a threshold value" or "a threshold value or less" may be used as a reference in response to the setting of the threshold value TH1 or TH2. That is, it is not necessary for "a threshold value or more" or "less than a threshold value" to be strictly applied, which includes both of a case of not including a value as the threshold value and a case of including the value as the threshold value.

REFERENCE SIGNS LIST

1: IN-VEHICLE DEVICE
3: PORTABLE DEVICE
5, 5a, 5b, 5c: REQUEST SWITCH
7, 7a, 7b, TRANSMISSION ANTENNA
8: RECEPTION ANTENNA
9: DOOR LOCK ACTUATOR
10: KEYLESS CONTROLLER
11: CPU
12: MEMORY
13: LF TRANSMITTER
14: RF TRANSMITTER
15: ACTUATOR DRIVE CIRCUIT
20: CONTROL UNIT
21: SWITCH DETERMINER
22: SIGNAL GENERATOR
23: CIPHER PROCESSOR
30: REMOTE CONTROLLER
32, 32a, 32b, 32c: RECEPTION ANTENNA

33: TRANSMISSION ANTENNA
35: CPU
36: MEMORY
37: LF RECEIVER
38: STRENGTH METER
39: RF TRANSMITTER
41: CALCULATOR
42: COMPARATOR
43: CIPHER PROCESSOR
44: SIGNAL GENERATOR
S1: ID
V: VEHICLE
S: REQUEST SIGNAL
S1, S2: REQUEST SIGNAL

The invention claimed is:

1. A relay attack determination device configured to determine a relay attack, in which wireless communications between an in-vehicle device and a portable device are relayed by a relay device, comprising:
a transmitter disposed on the in-vehicle device, the transmitter being configured to transmit a first signal and a second signal having an output condition different from an output condition in the first signal;
a receiver disposed on the portable device and including an antenna of plural axes respectively oriented in different directions to receive the first signal and the second signal in each of the plural axes;
a strength meter disposed on the portable device to measure a reception strength of the first signal and the second signal received by each of the plural axes of the receiver;
a comparator configured to execute a comparative process of reception strength ratios in the first signal and the second signal, based upon a measurement value of the reception strength; and
a determiner configured to determine the relay attack based upon a result of the comparative process in the comparator,
wherein in a case where the plural axes include an ineffective axis in which the measurement value of the reception strength of the first signal or the second signal deviates from a usable range, the comparator excludes the ineffective axis and executes the comparative process,
wherein the strength meter comprises a RSSI circuit, and
wherein the usable range is between a lower limit value and an upper limit value of a reception strength that can be measured accurately by the strength meter.

2. The relay attack determination device according to claim 1, wherein
in a case where the plural axes include the ineffective axis, the comparator executes the comparative process using the reception strength ratios of effective axes left by excluding the ineffective axis.

3. The relay attack determination device according to claim 1, wherein
in a case where the plural axes include the ineffective axis, the comparator replaces the measurement values of the first signal and the second signal of the ineffective axis by a preset value and executes the comparative process using the reception strength ratios calculated by using the preset value.

4. The relay attack determination device according to claim 2, wherein
the comparator compares, in a case where the plural axes include two or more effective axes, a difference between reception strength ratios of the first signal and the second signal in the effective axes with a first threshold value, and
the comparator compares, in a case where the plural axes include less than two effective axes, a difference between reception strength ratios of the first signal and the second signal in the plural axes with a second threshold value greater than the first threshold value.

5. The relay attack determination device according to claim 4, wherein
the comparator compares, in a case where the difference between the reception strength ratios of the first signal and the second signal in the effective axis is less than the first threshold value, the difference between the reception strength ratios of the first signal and the second signal in the plural axes with the second threshold value.

6. A relay attack determination device configured to determine a relay attack, in which wireless communications between an in-vehicle device and a portable device are relayed by a relay device, comprising:
a transmitter disposed on an in-vehicle device, the transmitter being configured to transmit a first signal and a second signal having an output condition different from an output condition in the first signal;
a receiver disposed on the portable device and including an antenna of three axes oriented in different directions to receive the first signal and the second signal;
a strength meter disposed on the portable device to measure a reception strength of the first signal to the second signal received by each of the plural axes of the receiver;
a comparator configured to execute a comparative process of reception strength ratios of the first signal and the second signal, based upon a measurement value of the reception strength; and
a determiner configured to determine the relay attack based upon a result of the comparative process in the comparator, wherein
the comparator compares a difference between the reception strength ratios of the first signal and the second signal in the plural axes with a second threshold value,
the comparator compares, in a case where the difference between the reception strength ratios is less than the second threshold value, the difference between the reception strength ratios with a first threshold value smaller than the second threshold value, and
wherein in a case where the plural axes include an ineffective axis in which the measurement value of the reception strength of the first signal or the second signal deviates from a usable range, the comparator excludes the ineffective axis in a comparative process using the first threshold value,
wherein the strength meter comprises a RSSI circuit, and
wherein the usable range is between a lower limit value and an upper limit value of a reception strength that can be measured accurately by the strength meter.

\* \* \* \* \*